United States Patent Office 3,433,338
Patented Mar. 18, 1969

3,433,338
CLUTCH ARRANGEMENT
Herbert A. Clements, Weybridge, England, assignor to S.S.S. Patents Limited, London, England
Filed Feb. 6, 1967, Ser. No. 614,099
Claims priority, application Great Britain, Feb. 9, 1966, 5,744/66
U.S. Cl. 192—67  3 Claims
Int. Cl. F16d 11/04, 11/10, 13/22

ABSTRACT OF THE DISCLOSURE

The invention relates to synchronous self-shifting rotary toothed clutch arrangements of the type comprising two rotary clutch members arranged substantially coaxially, one of the rotary clutch members having clutch teeth, and an intermediate member provided with clutch teeth and constrained for helical movement relative to the other rotary clutch member, the clutch arrangement also including means, e.g. pawl and ratchet mechanism, for initiating clutch engagement upon passage of the two rotary clutch members through rotational synchronism in one direction of relative rotation. To enable the clutch arrangement to accommodate some misalignment of the axes of rotation of the two rotary clutch members, in accordance with the invention an auxiliary member is provided which is drivably connected, in the angular sense, to the intermediate member and is drivably connected, in the angular sense, to the said other rotary clutch member via a flexible driving connection, e.g., a flexible diaphragm or driving teeth interengaged with clearance.

---

This invention relates to a rotary clutch arrangement for selectively establishing or interrupting a driving connection between two rotary members with their axes substantially in alignment.

Figure 1:
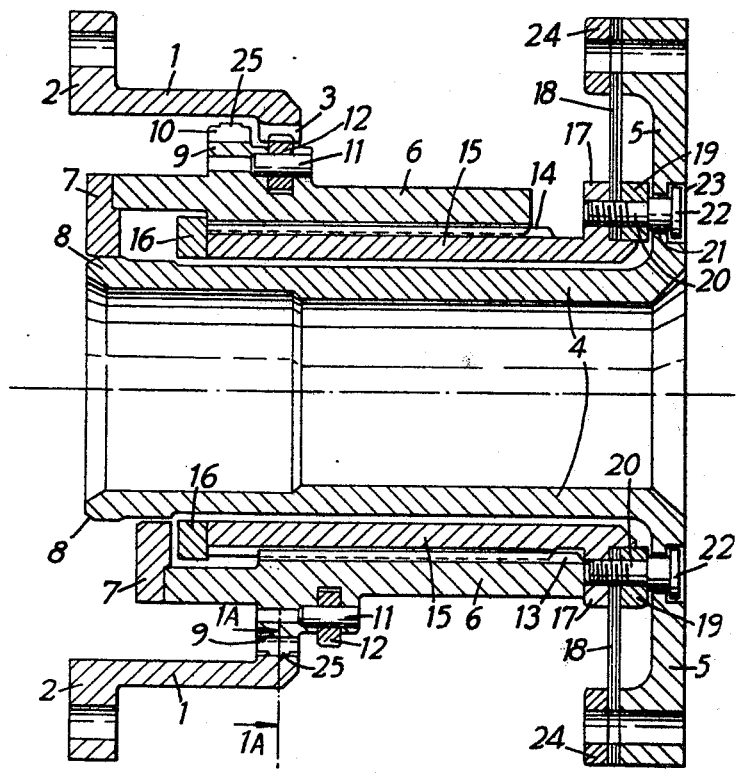

FIG. 1 of the drawings of British patent specification No. 977,714 shows a synchronous self-shifting clutch arrangement for automatically establishing or interrupting a driving connection between two shafts substantially mounted in line, the arrangement comprising an intermediate member constrained for helical movement relative to one of the shafts and provided with axially spaced rings of clutch teeth which in the engaged condition of the clutch arrangement are interengaged respectively with rings of clutch teeth carried by the shafts, pawl and ratchet mechanism being provided for initiating engagement of the sets of coacting clutch teeth in response to relative angular movement of the shafts in one direction. In the particular arrangement illustrated in the said figure pawls carried by one of the shafts cooperate with ratchet teeth carried by the intermediate member. If an axial stop adjacent the helical splines were to be used for preventing further movement of the engaged intermediate member along the helical splines, such a stop would prevent angular movement of the intermediate member relative to the shaft on which it is mounted, and so prevent the clutch arrangement functioning as a flexible coupling between the shafts. Hence the clutch teeth carried by the intermediate member and the coacting clutch teeth carried by one of the shafts are arranged to serve as rotational stops, the clutch teeth carried by the intermediate member moving helically into rotational contact with the coacting clutch teeth as the intermediate member moves helically relative to the shaft on which it is mounted.

In order to permit the required helical movement of the clutch teeth of the intermediate member relative to the coacting clutch teeth, every alternate clutch tooth of the teeth carried by the intermediate member and also every alternate clutch tooth of the coacting clutch teeth is omitted. This means that with teeth of normal width the load transmitting capacity would be reduced as compared with the case in which there is a full complement of teeth; hense in the arrangement illustrated in the said figure extra wide teeth are provided, but this has the disadvantage of reducing the flexibility of the clutch arrangement. An alternative to extra wide teeth would be a full complement of teeth with one flank of each of the coacting teeth chamfered to provide clearance for the helical movement; in this case also the load transmitting capacity of the clutch arrangement is limited since with such chamfering only a narrow face width is practicable.

The object of the invention is to provide a clutch arrangement which whilst having a full complement of clutch teeth which are not chamfered is capable of functioning as a flexible coupling and hence of accommodating misalignment of shafts between which the clutch arrangement is connected.

In accordance with the present invention, there is provided a rotary clutch arrangement comprising two rotary clutch members with their axes substantially in alignment, one of which members is provided with clutch teeth, an intermediate member provided with clutch teeth and constrained for helical movement relative to the other of said clutch members whereby to bring its clutch teeth into and out of interengagement with the clutch teeth of said one clutch member, said intermediate member being drivably connected, in the angular sense, to an auxiliary member which is drivably connected, in the angular sense, to the said other clutch member via a flexible driving connection which is axially spaced from the clutch teeth of said one clutch member and which connection in conjunction with the angular movement permitted by the clutch teeth when engaged enables the clutch arrangement to accommodate some misalignment of said rotary clutch members, the clutch arrangement also including means for initiating the movement of the intermediate member into toothed interengagement with the said one rotary clutch member when said rotary clutch members pass through synchronism in one direction of relative rotation.

Figure 1A:
Figure 2A:
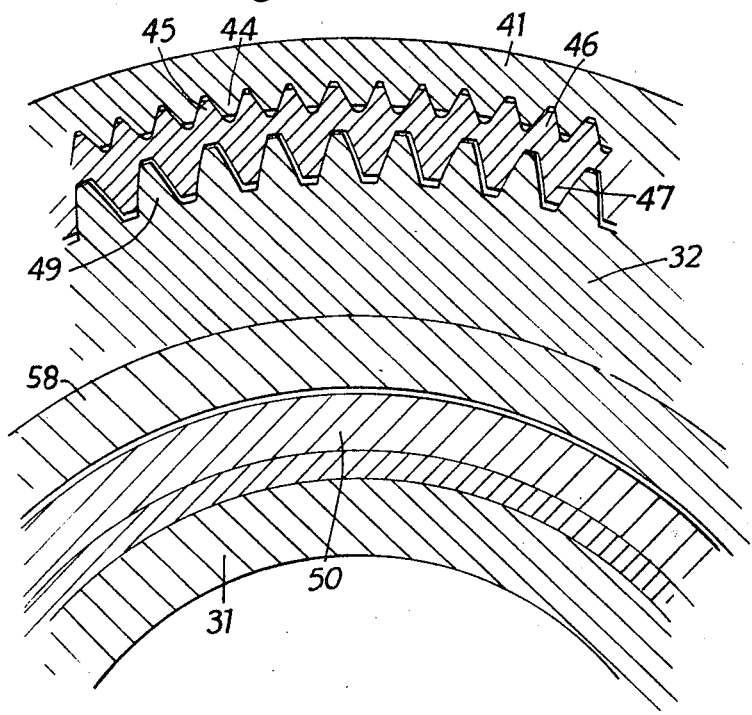
Figure 2:
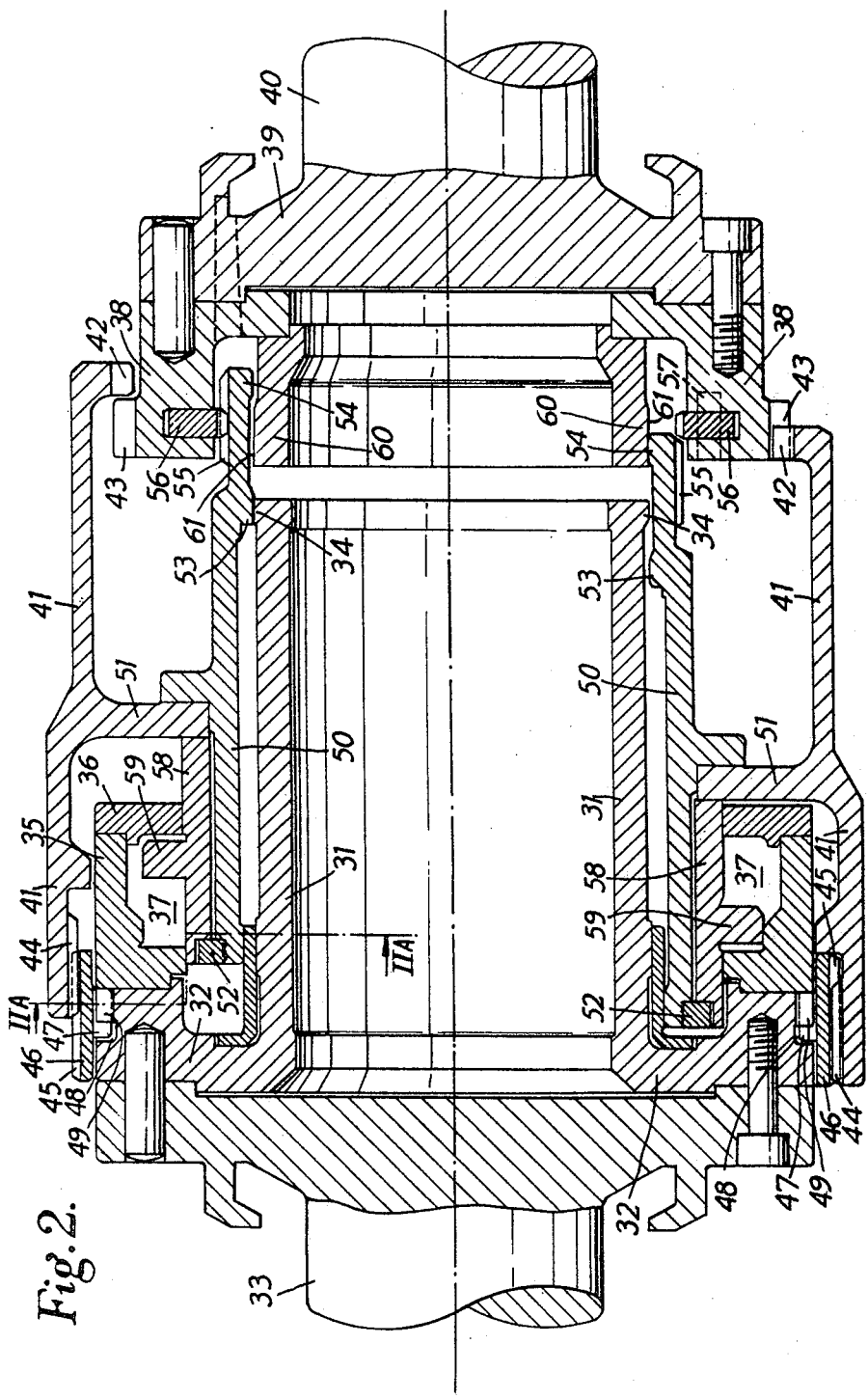

In the accompanying drawings:

FIG. 1 is a view in longitudinal section of a first embodiment of the invention, the clutch being shown in the upper half of the figure in a disengaged condition, and in the lower half of the figure in an engaged condition, FIG. 1A is a sectional view on the line 1A—1A of FIG. 1, FIG. 2 is a similar view of another embodiment of the invention, and FIG. 2A is a sectional view on the line IIA—IIA of FIG. 2.

Referring to FIG. 1, one of the rotary clutch members is constituted by a cylindrical member 1 formed with a radial flange 2 adapted to be bolted to a shaft (not shown). The member 1 is formed with a ring of internal clutch teeth 3 of normal width and spacing. The other rotary clutch member is constituted by a cylindrical sleeve 4 formed with a radial flange 5 adapted to be bolted to another shaft (not shown). The intermediate member is constituted by a sleeve 6 which carries at one end a radially inwardly projecting support ring 7 which, with the clutch disengaged, has its radially inner surface in contact with an annular support 8 formed on the sleeve 4. The intermediate member 6 is formed with a radially outwardly projecting annular flange 9 which is formed with a ring of external clutch teeth 10 and which carries a ring of pawl pins 11 on which are mounted pawls 12 arranged with their noses pointing in anticlockwise direction as viewed from the left hand end of the clutch as seen in FIG. 1. The intermediate member 6 is formed with internal right handed helical splines 13 engaged with external helical splines 14 on an auxiliary member comprising a cylindrical sleeve 15 provided at one end with a stop ring 16 and at the other end with a radially outwardly projecting annular flange 17. An annular flexible diaphragm 18 formed from a plurality of superimposed steel laminations has its radially inner periphery clamped between the flange 17 and a clamping ring 19 held in place by bolts 20 which extend with clearance through holes 21 in the flange 5 and are screwed into the flange 17, the bolts 20 having heads 22 which are accommodated with clearance in recesses 23 in the flange 5. The outer periphery of the diaphragm 18 is clamped between the outer periphery of the flange 5 and a ring 24 bolted to the flange 5. The ring 16 and the flange 17 serve as axial stops for limiting the helical movement of the intermediate member 6 relative to the auxiliary member 15.

The operation is as follows. Assuming that the clutch member 1 is stationary and that the clutch member 5 is rotating in clockwise direction as viewed from the left in FIG. 1, the clutch is in the disengaged condition, shown in the upper half of FIG. 1, in which the clutch teeth 10 are to the left of the clutch teeth 3. The pawls 12 ratchet past the clutch teeth 3.

When the direction of relative rotation of the members 1 and 5 tends to reverse, as by the member 1 being accelerated until it tends to overrun the member 5, pawls 12 are engaged by clutch teeth 3 and the intermediate member 6 is shifted helically to the right relative to the sleeve 15, thereby bringing the clutch teeth 10 precisely into initial interengagement with the clutch teeth 3. The interaction of the clutch teeth 10 and 3 then draws the intermediate member 6 further to the right until the clutch teeth 10 are fully interengaged with the clutch teeth 3, the intermediate member then being against the stop 17. The clutch is now in the fully engaged condition shown in the lower half of FIG. 1. During the clutch engaging movement of the intermediate member the support ring 7 rides off the annular support 8, but the intermediate member 6 and the auxiliary member 15 continue to be central relatively to the sleeve 4 owing to the engagement of supports 25, formed on the crowns of the clutch teeth 10, with the roots of the intertooth spaces of the clutch teeth 3.

If the shafts to which the flanges 2 and 5 are connected should be slightly out of alignment, the misalignment is accommodated by the flexible nature of the axially spaced driving connections between them, viz the flexible connection between the clutch member 1 and the intermediate member 6 formed by the interengaged clutch teeth 3 and 10, and the flexible connection between the auxiliary member 15 and the clutch member 4 formed by the flexible annular diaphragm 18.

With the clutch fully engaged, driving torque is transmitted from the clutch member 1 to the clutch member 5 via the interengaged clutch teeth 3 and 10, the helical splines 13 and 14, and the diaphragm 18.

If now the clutch member 1 is retarded, the interaction of the clutch teeth 3 and 10 shifts the intermediate member 6 helically to the left relative to the auxilary member 15, bringing the clutch teeth 10 out of engagement with the clutch teeth 3 and bringing the pawls 12 back into ratcheting engagement with the clutch teeth 3, and bringing the support ring 7 back into engagement with the annular support 8, the movement of the intermediate member 6 to the left being limited by the stop ring 16.

The clutch shown in FIG. 2 comprises a first clutch member constituted by a cylindrical part 31 formed with a radially outwardly projecting annular flange 32 bolted to a flange on a driving shaft 33. At the right hand end as seen in the figure the sleeve 31 is formed with an annular support 34. To the flange 32 is bolted a ring 35 to which is fixed a ring 36, the rings 35 and 36 together forming a radially inwardly open annular dashpot chamber 37. A second clutch member is formed by a cylindrical part 38 bolted to a flange 39 on a driven shaft 40. The intermediate member of the clutch comprises a sleeve 41, which is formed at one end with a ring of internal clutch teeth 42 of normal width and spacing, adapted to cooperate with a ring of external clutch teeth 43 of normal width and spacing formed on the clutch member 38, the other end of the sleeve 41 being formed with internal right-handed helical splines 44 which are continuously engaged with external helical splines 45 on one auxiliary member 46 formed with a set of internal driving teeth 47 which project with clearance into an annular groove 48 in the flange 32 and are interengaged with clearance with a set of external driving teeth 49 formed on the flange 32. A cylindrical sleeve 50 is fixed to a flange 51 of the sleeve 41, and at one end carries a ring 52 and at the other end is formed with axially spaced annular supports 53 and 54, and with a ring of external ratchet teeth 55 with which cooperate pawls 56 mounted on pawl pins 57 carried by the clutch member 38. Between the ring 52 and the flange 51 is located a cylindrical member 58 formed with a radially outwardly projecting flange 59 which constitutes a dashpot piston which projects into the dashpot chamber 37. A support ring 60 formed with an annular support 61 is fixed to the clutch member 38.

The operation is as follows. Assuming that the shaft 33 is stationary and the shaft 40 is rotating in clockwise direction as viewed from the left hand end in FIG. 2, the clutch is in the disengaged condition shown in the upper half of the figure, and the pawls 56, the noses of which point in anticlockwise direction as viewed from the left, ratchet past the ratchet teeth 55.

If the direction of relative rotation of the shafts 33 and 40 tends to reverse, as by the shaft 33 being accelerated to tend to overtake the shaft 40, ratchet teeth 55 engage pawls 56 and the intermediate member 41 is shifted helically to the left relative to the clutch member 31 owing to the interengaged helical splines 44 and 45, bringing the clutch teeth 42 into precise initial interengagement with the clutch teeth 43, the interaction of these teeth then drawing the intermediate member 41 into full toothed engagement with the clutch member 38, the parts then having the positions shown in the lower half of FIG. 2. During the engaging movement of the intermediate member 41 the annular support 53 rides off the support 34 and the annular support 54 moves on to the support 61, so that the intermediate member 41 and the auxiliary member 46 continue to be centered by the supports 54 and 61, and by the engagement of the crowns of the driving teeth 49 with the roots of the intertooth spaces of the driving teeth 47.

If the shafts 33 and 40 should be out of alignment the misalignment is accommodated by the flexible nature of the axially spaced driving connections between them, vis, the flexible connection between the shaft 33 and the auxiliary member 46 formed by the driving teeth 47 and 49 interengaged with clearance, and the flexible connection between the intermediate member 41 and the shaft 40 formed by the clutch teeth 42 and 43 interengaged with clearance.

The bore of the dashpot chamber 37 is shaped, as shown, so that during the initial part of the movement of the intermediate member from the disengaged to the engaged position there is a wide clearance around the piston 59 such that liquid can readily flow from one side to the other of the piston and there is little or no restraint on the movement of the intermediate member. During the subsequent part of the said movement of the intermediate member, however, there is substantially no clearance around the piston and the dashpot is effective to cushion the final movement of the intermediate member into toothed engagement.

When the shaft 33 is retarded the clutch disengages due to the interaction of the clutch teeth 42 and 43 and the helical splines 44 and 45, and the intermediate member 41 is shifted to the right until the parts have resumed the positions shown in the upper half of FIG. 2.

What I claim is:

1. A synchronous self-shifting clutch arrangement of the type comprising two rotary clutch members with their axes of rotation substantially in alignment, clutch teeth on one of said rotary clutch members, an intermediate member, clutch teeth on said intermediate member, means constraining said intermediate member for helical movement relative to the other of said rotary clutch members whereby to bring the clutch teeth of said intermediate member into and out of interengagement with the clutch teeth of said one rotary clutch member, and means operable to shift said intermediate member relative to said other rotary clutch member into a position of at least partial interengagement of the clutch teeth of said intermediate member with the clutch teeth of said one rotary clutch member upon passage of said rotary clutch members through rotational synchronism in one direction of relative rotation, wherein the improvement comprises an auxiliary member, a helical spline connection between said intermediate member and said auxiliary member, and a flexible rotary driving connection between said auxiliary member and said other rotary clutch member, said flexible driving connection being axially spaced from the clutch teeth of said one rotary clutch member.

2. A synchronous self-shifting clutch arrangement according to claim 1 wherein said flexible driving connection comprises a flexible diaphragm, and means drivably connecting said diaphragm to said auxiliary member and to said other rotary clutch member 3. A synchronous self-shifting clutch arrangement according to claim 1 wherein said flexible driving connection comprises sets of driving teeth, interengaged with clearance, carried respectively by said auxiliary member and by said other rotary clutch member.

References Cited

UNITED STATES PATENTS

| | | | |
|---|---|---|---|
| 1,912,004 | 5/1933 | Matthews | 192—55 |
| 1,985,127 | 12/1934 | Wemp | 192—55 XR |
| 2,090,787 | 8/1937 | Eberhard | 192—55 XR |
| 3,203,526 | 8/1965 | Clements. | |
| 3,272,295 | 9/1966 | Clements. | |

MARTIN P. SCHWADRON, *Primary Examiner.*

U.S. Cl. X.R.

192—53